(12) United States Patent
Badger et al.

(10) Patent No.: US 8,019,606 B2
(45) Date of Patent: Sep. 13, 2011

(54) IDENTIFICATION AND SELECTION OF A SOFTWARE APPLICATION VIA SPEECH

(75) Inventors: Eric N. Badger, Issaquah, WA (US); Cameron Ali Etezadi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 11/824,497

(22) Filed: Jun. 29, 2007

(65) Prior Publication Data

US 2009/0006100 A1 Jan. 1, 2009

(51) Int. Cl.
*G10L 21/00* (2006.01)

(52) U.S. Cl. ............... 704/270.1; 704/235; 704/275; 704/257; 704/231; 704/9; 379/88.01; 379/88.02; 379/88.17; 345/161; 345/156; 345/167; 345/159; 709/218; 455/563; 455/566

(58) Field of Classification Search ............ 704/235, 704/270.1, 275, 270, 257, 243, 260, 231, 704/9; 379/88.01, 88.02, 88.17; 345/161, 345/156, 167, 159, 155; 709/218; 455/563, 455/566

See application file for complete search history.

(56) References Cited

U.S. PATENT DOCUMENTS

| | | | | |
|---|---|---|---|---|
| 5,893,063 | A | 4/1999 | Loats et al. | 704/275 |
| 6,216,013 | B1* | 4/2001 | Moore et al. | 455/557 |
| 6,892,083 | B2* | 5/2005 | Shostak | 455/575.6 |
| 6,912,500 | B2* | 6/2005 | Hickey et al. | 704/270 |
| 7,036,128 | B1* | 4/2006 | Julia et al. | 719/317 |
| 7,082,397 | B2* | 7/2006 | Cohen et al. | 704/270.1 |
| 7,289,607 | B2* | 10/2007 | Bhargava et al. | 379/88.02 |
| 7,328,158 | B1* | 2/2008 | Burridge et al. | 704/270 |
| 7,383,189 | B2 | 6/2008 | Halonen et al. | 704/275 |
| 7,460,999 | B2 | 12/2008 | Herron et al. | 704/275 |
| 2001/0047258 | A1* | 11/2001 | Rodrigo | 704/256 |
| 2002/0032875 | A1* | 3/2002 | Kashani | 713/300 |
| 2002/0077823 | A1* | 6/2002 | Fox et al. | 704/260 |
| 2002/0147586 | A1* | 10/2002 | Belrose | 704/233 |
| 2002/0150256 | A1* | 10/2002 | Belrose et al. | 381/17 |
| 2002/0156633 | A1* | 10/2002 | Hickey et al. | 704/270 |
| 2003/0046401 | A1* | 3/2003 | Abbott et al. | 709/228 |
| 2003/0101054 | A1* | 5/2003 | Davis et al. | 704/235 |
| 2004/0111259 | A1* | 6/2004 | Miller et al. | 704/231 |
| 2005/0125235 | A1 | 6/2005 | Lazay et al. | 704/275 |
| 2006/0069573 | A1* | 3/2006 | Falcon et al. | 704/275 |
| 2006/0106614 | A1 | 5/2006 | Mowatt et al. | 704/275 |
| 2006/0122836 | A1* | 6/2006 | Cross et al. | 704/260 |
| 2006/0235700 | A1 | 10/2006 | Wong et al. | 704/275 |
| 2007/0213984 | A1* | 9/2007 | Ativanichayaphong et al. | 704/257 |
| 2007/0233495 | A1* | 10/2007 | Agapi et al. | 704/270 |

(Continued)

OTHER PUBLICATIONS

Vargas et al., "Combining Speech and Earcons to Assist Menu Navigation", http://www.icad.org/websiteV2.0/Conferences/ICAD2003/paper/09%20Vargas.pdf., Published Date: Jul. 6-9, 2003, 4 pp.

(Continued)

*Primary Examiner* — Vijay Chawan
(74) *Attorney, Agent, or Firm* — Merchant & Gould

(57) ABSTRACT

An audible indication of a user's position within a given speech grammar framework is provided for a speech-enabled software application, and recognition of speech grammars are limited to use only when a software application that has requested a given set of speech grammars is in focus by a user of an associated mobile computing device.

20 Claims, 5 Drawing Sheets

U.S. PATENT DOCUMENTS

2007/0250317 A1* 10/2007 Davis et al. .................. 704/235
2008/0140416 A1   6/2008 Shostak .................... 704/270.1

OTHER PUBLICATIONS

Klante, "Auditory Interaction Objects for Mobile Applications", http://www-cg-hci-e.informatik.uni-oldenburg.de/resources/WWCS2004-Klante-Auditory%20Interaction%20Objects.pdf, Published Date: Mar. 25, 2004, 6 pp.

Brewster et al., "Earcons as a Method of Providing Navigational Cues in a Menu Hierarchy", http://www.dcs.gla.ac.uk/~stephen/papers/HCI96_MenuHierarchy.PDF, Published Date: Nov. 18, 1996, 14 pp.

* cited by examiner

IDENTIFICATION AND SELECTION OF A SOFTWARE APPLICATION VIA SPEECH

BACKGROUND

With the advent of mobile telephones and mobile computing devices, speech interface products have been developed for allowing users to communicate with and command their mobile computing devices, for example, cell phones, personal digital assistants, and the like via audible or voice commands. In current implementations of speech command function systems, all speech commands are global. That is, any command, such as "call John Smith at home," may be used at any time when a user interacts with the speech user interface. Such global commands may only be used because a developer of the speech command user interface provides all possible speech "grammars" or phrases available for recognition by the system. Great care must be taken in the design of such speech user interfaces to ensure that speech commands do not conflict with one another at any point.

However, when a given mobile computing device, for example, a mobile telephone, is equipped with multiple software applications, each of which enabled for receiving speech commands, individual speech "grammars" or phrases may conflict with each other. That is, if two software applications, each of which are enabled for speech commands, are existing on a single mobile computing device, or are accessible from a single mobile computing device, each software application may include identical speech grammars that have a different meaning for each respective software application. For example, each of two software applications loaded on a mobile telephone may recognize the word "open," but each of the respective software applications may interpret the word differently and use the word to launch or activate a different functionality associated with the respective software application. Thus, a conflict may occur when a user speaks a command into a mobile computing device where certain "grammars" or phrases available for recognition are recognized by more than one available software application.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an audible indication of a user's position within a given speech grammar framework for a speech-enabled software application and by limiting recognition of speech grammars to use only when a software application that has requested a given set of speech grammars is in focus by a user of the associated mobile computing device.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
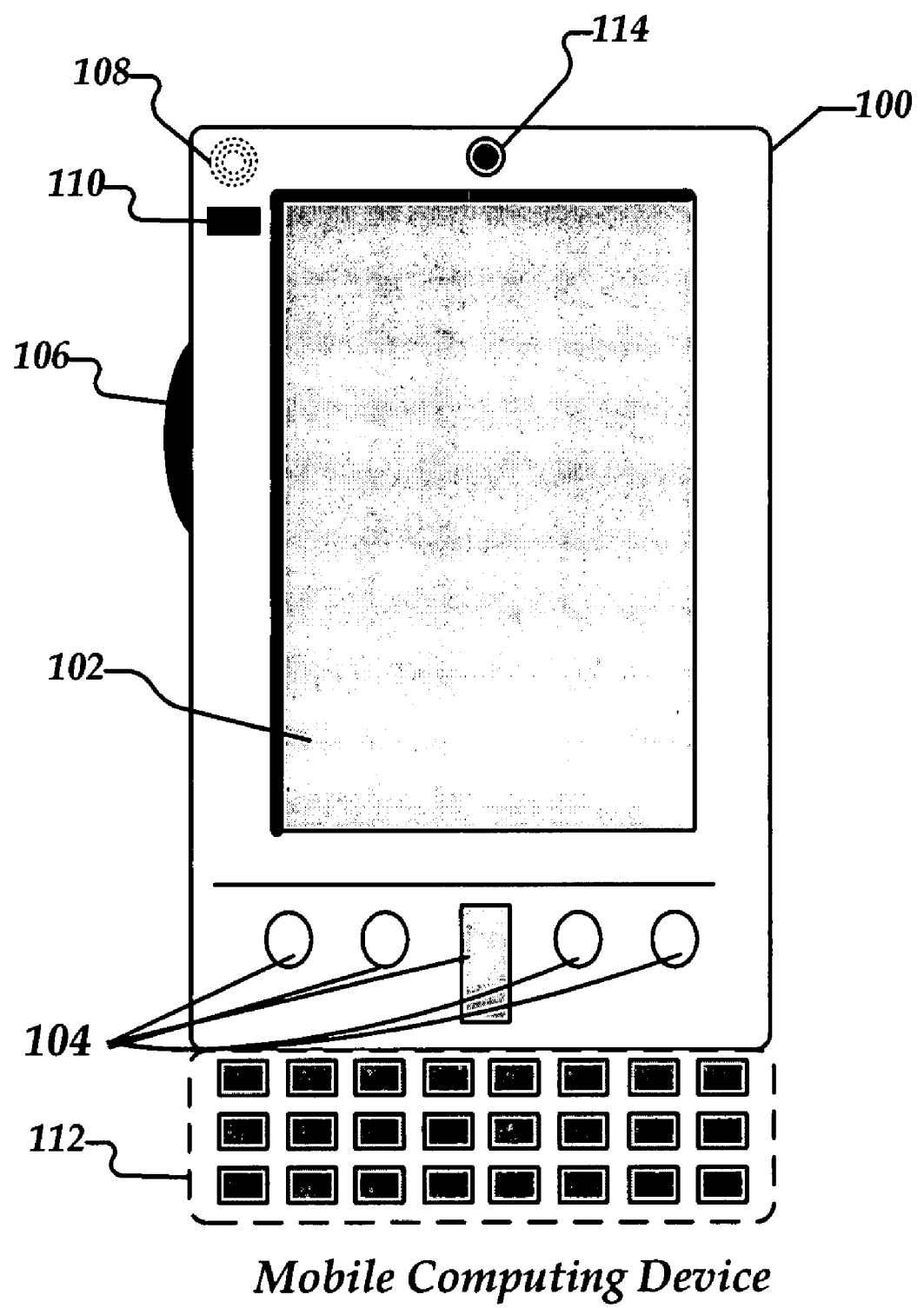
FIG. 1 is a diagram of an example mobile telephone/computing device.

As briefly described above, embodiments of the present invention are directed to providing an audible indication of a user's position within a speech grammar associated with a speech-enabled software application and to limiting use of a speech grammar associated with a software application to when the software application that has requested the speech grammar has focus from a user of the software application. According to embodiments, an audible notification or "cue" is assigned to each software application that may be activated and operated via speech commands. The audible cue may take the form of a brief sound file of some sort that is played or a text-to-speech (TTS) announcement that is played at the beginning of a user interaction with a given software application to indicate to the user which software application presently has focus on the user's mobile computing device. For example, if a music program is currently the top-level or "in focus" software application on a mobile or handheld computing device, a brief musical content, such as a guitar riff content may be played to a user to indicate to the user that a music program is the presently the in focus or top-level software application in use on the computing device. For another example, if a telephone application is the currently in focus or top-level software application in use on a mobile computing device, a TTS announcement such as "phone" may be played to the user to indicate to the user that a telephone application is the currently in focus or top-level application.

According to an embodiment, the audible cue is provided to the user when the user takes an action to request some functionality available via her mobile computing device. For example, if a user presses a button on a mobile telephone without looking at the mobile telephone, an audible cue may be presented to the user to alert the user as to the type of software application that is presently in focus on the device. For example, if the user is utilizing a Bluetooth-enabled headset adapted to the user's ear that sends and receives information to a remotely positioned mobile telephone/computing device, the pressing of a button on the Bluetooth headset, or the speaking of a generic command, for example, "focus" or "application," may cause the playing of the audible cue to let the user know which application is presently the top-level or in focus application on her mobile computing device.

In the case of a TTS string announcement, the TTS string normally may be garnered from a title text of a presently in focus application's main window, regardless of whether the window itself is visible or not on a user's mobile computing device. Visible "focus" as handled by the window manager and audible "focus," as handled by a speech service are parallel and functionally similar concepts, although the two need not operate in synchronization. Alternatively, the visible focus and the audible focus may by operated synchronously to provide a hands-free, eyes-free experience for the user where the audible focus indicator described herein will notify the user of a corresponding visible focus on the display screen of the mobile computing device 100.

As a given software application enables and disables sub-grammars, or "dialogs," the audible cues may change hierarchically in a manner similar to a file system directory structure. For example, an audible cue of "phone" may transition to a sub-grammar for "phone dialer" or "phone contacts." Alternatively the audible cues may be concatenated or may be registered by the application to be coherent.

In addition to the audible cues provided herein, a method of directory structure traversal may be provided to the user in a speech interface. For example, as described above, a key press on the associated mobile computing device or the speaking of a generic command may begin speech interaction with an application running on the device. Navigation deeper in a tree of speech-enabled commands may be handled through speech interactions, via either a keyword mechanism or a top-level command that changes context. Navigation shallower in the tree of speech-enabled commands may be accomplished through a longer key press at initiation of the speech interaction, in a manner similar to the well-known pressing of an "ESC" key or an associated escape keystroke to take a user's focus on the functionality of a given software application to a higher level.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention may be utilized for both mobile and wired telephones. For purposes of illustration, embodiments of the present invention will be described herein with reference to a mobile telephone 100 having a telephone system 200, but it should be appreciated that the components described for the mobile telephone 100 with its mobile telephone system 200 are equally applicable to a wired telephone having similar or equivalent functionality for providing unique call announcements described herein.

The following is a description of a suitable mobile device, for example, the camera phone or camera-enabled computing device, discussed above, with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 102 and input buttons 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
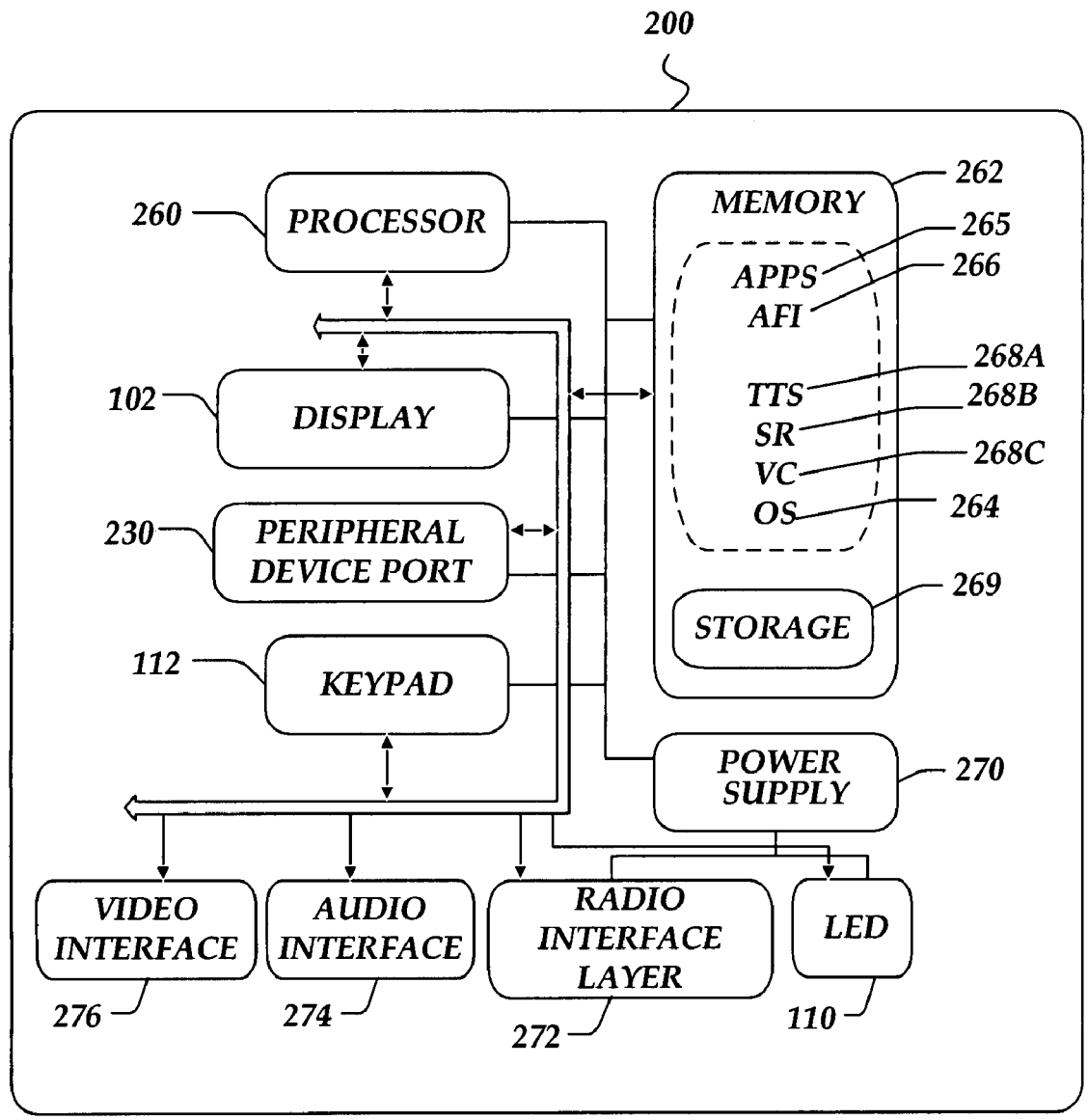
FIG. 2 is a block diagram illustrating components of a mobile telephone/computing device that may serve as an operating environment for the embodiments of the invention.

FIG. 2 is a block diagram illustrating components of a mobile computing device used in one embodiment, such as the mobile telephone/computing device 100 illustrated in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, email, scheduling, instant messaging, and media player applications. System 200 can execute an Operating System (OS) such as, WINDOWS XP®, WINDOWS MOBILE 2003® or WINDOWS CE® available from MICROSOFT CORPORATION, REDMOND, WASH. In some embodiments, system 200 is integrated as a computing device, such as an integrated personal digital assistant (PDA) and wireless phone.

In this embodiment, system 200 has a processor 260, a memory 262, display 102, and keypad 112. Memory 262 generally includes both volatile memory (e.g., RAM) and non-volatile memory (e.g., ROM, Flash Memory, or the like). System 200 includes an Operating System (OS) 264, which in this embodiment is resident in a flash memory portion of memory 262 and executes on processor 260. Keypad 112 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 265 are loaded into memory 262 and run on or outside of operating system 264. Examples of application programs include phone dialer programs, e-mail programs, PIM (personal information management) programs, such as electronic calendar and contacts programs, word processing programs, spreadsheet programs, Internet browser programs, and so forth. System 200 also includes non-volatile storage 268 within memory 262. Non-volatile storage 269 may be used to store persistent information that should not be lost if system 200 is powered down. Applications 265 may use and store information in non-volatile storage 269, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 269 synchronized with corresponding information stored at the host computer. In some embodiments, non-volatile storage 269 includes the aforementioned flash memory in which the OS (and possibly other software) is stored.

As described herein, embodiments of the present invention are directed to providing an audible indication of a user's position within a speech grammar associated with a speech-enabled software application and to limiting use of a speech grammar associated with a software application to when the software application that has requested the speech grammar has focus from a user of the software application. According to one embodiment, speech-enabled applications 265, 305, 310, 315 (see FIG. 3) may be stored on the mobile computing device 100, as described above, or alternatively, speech-enabled applications may be stored remotely and may be accessed by the mobile computing device 100 via a distributed network, such as an intranet or the Internet via the radio 272, described below. That is, embodiments of the present invention are not limited to interacting with the applications that are located on the client device (100), but may receive grammars and send recognition responses to remote applications and systems.

An audible application focus indicator application (AFI) 266 is operative to provide an audible indication of a user's position within a speech grammar associated with a speech-enabled software application and to limit use of a speech grammar associated with a software application to when the software application that has requested the speech grammar has focus from a user of the software application, as described herein. The AFI application 266 may work in concert with a text-to-speech system, a speech recognition system, a voice command system, other applications and data, as described herein.

The text-to-speech (TTS) system 268A is a software application operative to receive text-based information and to generate an audible announcement from the received information. As is well known to those skilled in the art, the TTS system 268A may access a large lexicon or library of spoken words, for example, names, places, nouns, verbs, articles, or any other word of a designated spoken language for generating an audible announcement for a given portion of text. The lexicon of spoken words may be stored at storage 269. According to embodiments of the present invention, once an audible announcement is generated from a given portion of text, the audible announcement may be played via the audio interface 274 of the telephone/computing device 100 through a speaker, earphone or headset associated with the telephone 100.

The speech recognition (SR) system 268B is a software application operative to receive an audible input from a called or calling party and for recognizing the audible input for use in call disposition by the ICDS 300. Like the TTS system 268A, the speech recognition module may utilize a lexicon or library of words it has been trained to understand and to recognize.

The voice command (VC) system 268C is a software application operative to receive audible input at the device 100 and to convert the audible input to a command that may be used to direct the functionality of the device 100. According to one embodiment, the voice command system 268C may be comprised of a large lexicon of spoken words, a recognition function and an action function. The lexicon of spoken words may be stored at storage 269. When a command is spoken into a microphone of the computing device 100, the voice command system 268C receives the spoken command and passes the spoken command to a recognition function that parses the spoken words and applies the parsed spoken words to the lexicon of spoken words for recognizing each spoken word. Once the spoken words are recognized by the recognition function, a recognized command, for example, "forward this call to Joe," may be passed to an action functionality that may be operative to direct the call forwarding activities of a mobile computing device 100. According to an embodiment, each of the TTS system 268A, the SR system 268B and the VC system 268C may be hosted on a computing device remote from the mobile computing device 100 and may be accessed by the mobile computing device 100 via the radio 272, described below.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 265 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices. The LED 110 may be used to provide visual notifications and an audio interface 274 may be used with speaker 108 (FIG. 1) to provide audio notifications. These devices may be directly coupled to power supply 270 so that when activated, they remain on for a duration dictated by the notification mechanism even though processor 260 and other components might shut down for conserving battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 114 (FIG. 1) to record still images, video stream, and the like. According to some embodiments, different data types received through one of the input devices, such as audio, video, still image, ink entry, and the like, may be integrated in a unified environment along with textual data by applications 265.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 269. Computer storage media may include volatile and nonvolatile, removable and non-removable media implemented in any method or technology for storage of information, such as computer readable instructions, data structures, program modules, or other data.

Figure 3:
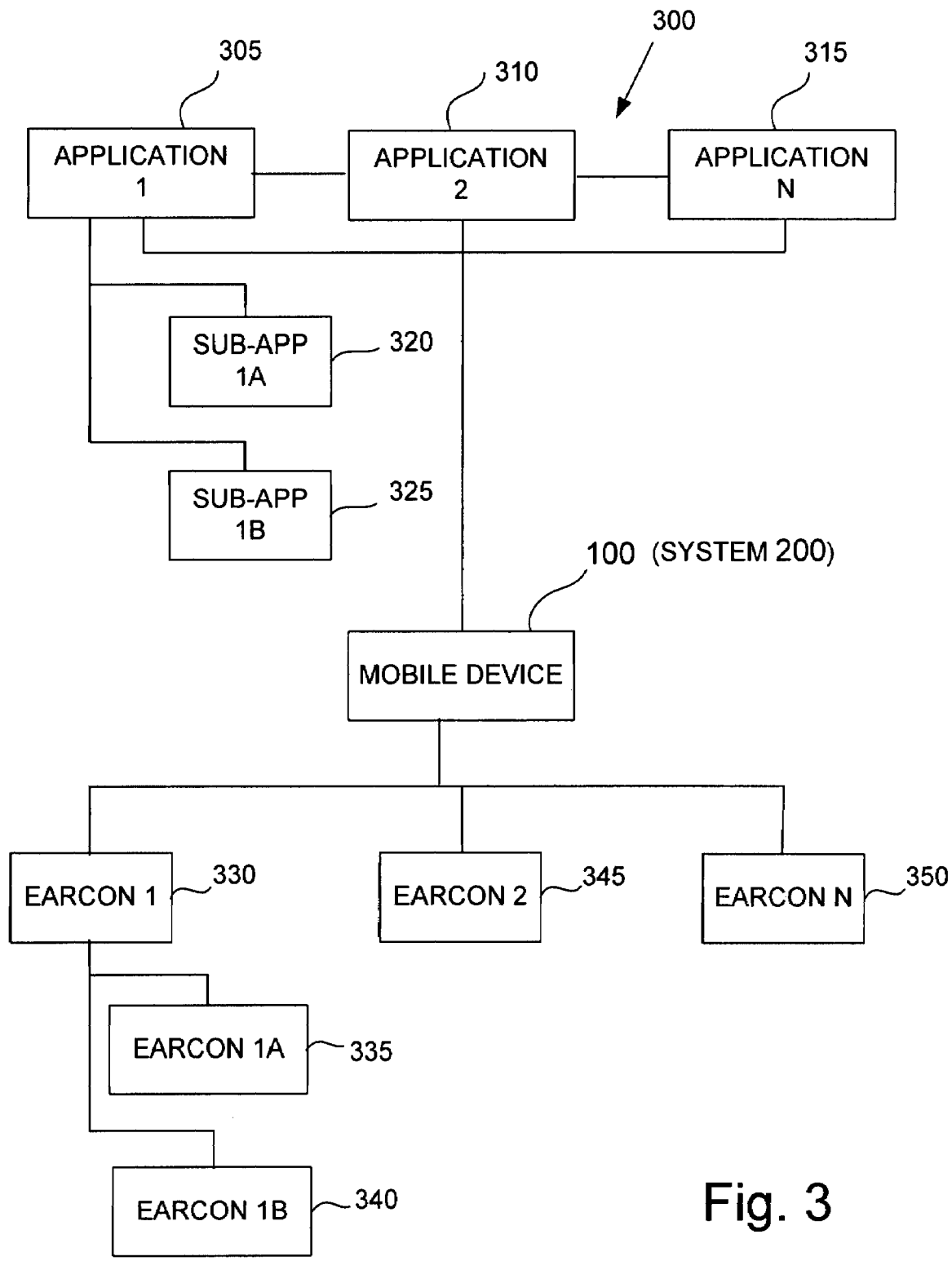
FIG. 3 is a simplified block diagram illustrating a system architecture for providing an audible indication of a user's position within a given speech grammar.

FIG. 3 is a simplified block diagram illustrating a system architecture for providing an audible indication of a user's position within a given speech grammar. According to embodiments, the mobile computing device 100 and its related system 200, illustrated and described above with reference to FIGS. 1 and 2, for example, a handheld personal digital assistant, a mobile telephone, and the like, or a wired computing device may contain one or more software applications 305, 310, 315 for providing various functionalities to a user of the device 100. For example, the application 305 may be a telephone application for operating on a mobile computing device 100, the application 310 may be an electronic mail and calendaring application operating on the mobile computing device 100, and the application 315 may be a word processing application for preparing documents on the mobile computing device 100.

Each of the applications 305, 310, 315 may have components or modules acting as sub-applications 320, 325 for providing various functionalities of the respective applications. For example, the application 305 may be in the form of a telephone application operating on a mobile computing device and a sub-application 320 may be a software module of the telephone application for dialing numbers of called parties. A second sub-application 325 of the application 305 may be in the form of a software module for establishing or modifying one or more operating settings for the telephone application 305. As should be appreciated, each of the software applications 305, 310, 315 operating on the mobile computing device 100 may have multiple software modules for providing various functionalities of the respective applications.

As described above, speech-enabled applications 305, 310, 315 and any related sub-applications 320, 325 may be stored on the mobile computing device 100, as described above, or alternatively, these applications and sub-applications may be stored remotely and may be accessed by the mobile computing device 100 via a distributed network, such as an intranet or the Internet via the radio 272. For example, a home computer may contain an assortment of a user's DVDs and music files. The user may have an application 305 running on her home computer that is registered with her mobile telephone 100 that allows her to issue commands into her mobile telephone that will affect the application 305 running on her home computer. For example, the user may be able to play any one of her DVD movies by name, or play any song on her home stereo system by saying the artist's name into her mobile telephone. Thus, the audible indication of a user's position in the speech grammar of a given in focus application may be associated with an application running remotely from the user's mobile computing device 100.

According to embodiments, the applications 305, 310, 315 may be speech-enabled for allowing a user to command the functionalities of the applications and the components or modules making up the applications through speech commands. For example, if the application 305 is a telephone application, a speech command of "telephone" may be understood by a voice command module 268C, described above, as a command for launching the telephone application 305. Indeed, a set of speech "grammars" or phrases which may be recognized by the application 305 may be established for commanding high-level functions associated with the application 305. In addition, a set of sub-grammars may be established for commanding the functionalities of each of the sub-applications (components or modules) 320, 325 of the application 305. For example, if the application 305 is a telephone application for operating on a mobile computing device 100, a first set of speech grammars may be associated with high-level functionalities of the application 305. If the sub-application 320 is a software module operative to provide telephone dialing functionality, the sub-application 320 may have its own set of speech-grammars to include phrases recognized by the voice command module 268C for commanding the sub-application 320 associated with the example telephone dialer module. Likewise, if the sub-application 325 is associated with a telephone settings module, a set of speech grammars may be established for commanding the functionalities of the phone settings sub-application 325.

For example, a set of speech grammars associated with the example telephone application 305 may include phrases such as "telephone," "phone dialer," "phone settings," "phone messages," and the like. If the example telephone application 305 is the currently in focus or top-level application in use on the mobile computing device 100, the speaking of one of the high-level speech grammar phrases, as described above, may cause initiation of a module or component of the application associated with the spoken grammar. For example, if the user speaks the phrase "phone settings" into a microphone operatively associated with the mobile computing device 100, the voice command module 268C may receive the spoken phrase and recognize the spoken words, via the speech recognizer module 268B, as a command associated with the sub-application 325 for operating on the phone settings functionality of the telephone application 305.

Once the voice command module recognizes the spoken command as being associated with the telephone settings module, the voice command may retrieve a set of speech grammars associated with the identified sub-application 325 which will contain voice commands associated with phone settings for the associated telephone application 305. As discussed above, however, a problem exists when speech grammars are available for other software applications 310, 315 operating on the mobile computing device 100 because the voice command module 268C may become confused as to which set of speech grammars to retrieve in response to a spoken command, particularly when a spoken command, for example, a generic command such as "open," or "save," is available to more than one software application.

According to embodiments of the present invention, an audible indicator, referred to herein as an "Earcon" may be used to indicate to a user the present in focus or top-level functionality available on her mobile computing device 100. Referring to FIG. 3, for example, a first Earcon 330 may be applicable to the first application 305, a second Earcon 345 may be applicable to the application 310 and a third Earcon 350 may be applicable to the application 315. Likewise, sub-Earcons 335, 340 may be applicable to the sub-applications 320, 325. According to embodiments, each of the Earcons includes an audible indication as to the functionality of a given software application that is presently in focus or top-level for the mobile computing device 100.

For example, if a user has her mobile computing device 100 in her pocket, purse, or a briefcase, and the user is communicating with her mobile computing device 100 via a remote headset, for example, a Bluetooth-enabled headset or earphone/microphone combination, the user will have no way of readily viewing the mobile computing device to see which if any software applications are currently in focus or at a top-level on the mobile computing device. For example, the user may believe that a telephone application 305 is presently the in focus application on her mobile telephone 100, but instead, an electronic calendaring application 310 may be currently in focus on her mobile telephone 100 because it is the last application she used before she placed the mobile telephone 100 in a remote location out of view. According to embodiments of the present invention, if the user takes an action with respect to the mobile computing device for using a functionality of an in focus or top-level application, an Earcon applicable to the currently in focus application functionality will be played to the user via a speaker of the mobile computing device 100 or via a headset, earphone or other device available to the mobile computing device for hearing the Earcon.

For example, if the user presses a functionality selection button on her Bluetooth-enabled headset, and the presently-in use software application on her mobile telephone 100 is the telephone application 305, an Earcon such as "phone" may be played to the user to indicate to the user that the phone application 305 is the currently in-use application. Thus, if the user desires the use of a different software application, the user will be alerted that she must navigate to the desired software application prior to issuing any voice commands. Thus, if the user hears an Earcon such as "telephone," but the user desires to operate her electronic calendaring application, the user will know that she must change the focus from the currently in focus telephone application 305 to the desired electronic calendaring application 310.

Similarly, if the user performs an action for obtaining the functionality of a given software application, for example, by pressing an application select button on her Bluetooth-enabled headset, and the user hears an Earcon such as "contacts," then the user will know that the presently in focus or top-level functionality on her mobile computing device 100 is the contacts sub-application of her electronic calendaring application 310. Thus, an audible indication (Earcon) may be provided for alerting a user of the presently in focus or top-level software functionality on her mobile computing device 100 so that the user does not have to physically retrieve the mobile computing device for looking at a display screen to determine the software application status of her device 100.

Figure 4:
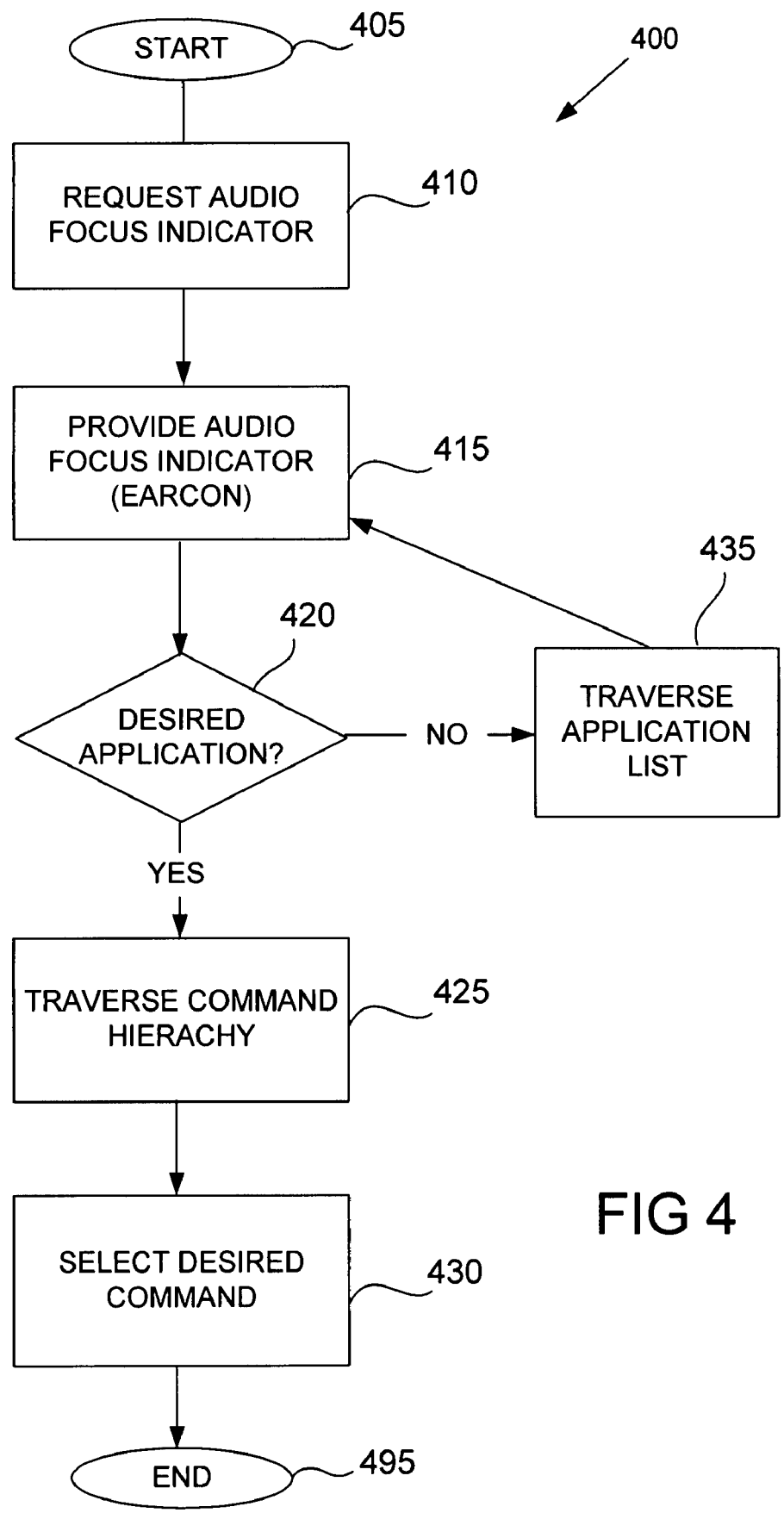
FIG. 4 is a logical flow diagram illustrating a method for providing an audible indication of a user's position within a given speech grammar.

According to an embodiment, the audible indicator Earcons, described herein, may be used to assist in the navigation or traversal of hierarchically arranged functionalities of the software applications 305, 310, 315 available on the user's mobile computing device 100. FIG. 4 is a logical flow diagram illustrating a method for providing an audible indication of a user's position within a given speech grammar. The routine 400 begins at start operation 405 and proceeds to operation 410 where a user requests an audio focus indicator or Earcon for the presently in focus or top-level software application functionality. According to one embodiment, the user may physically press a button or key on her mobile computing device 100, or on a remote headset/microphone unit with which the user communicates with a remotely secured mobile computing device 100. For example, a given mobile telephone 100 may be equipped with a button on the exterior of the device which when selected causes an indication of the currently in focus or top-level software functionality.

If the currently in focus software functionality is a contacts function of an electronic calendaring application, pressing the example button may cause the launching of a contacts user interface on the screen of the mobile computing device 100. According to embodiments of the present invention, selecting the example button may cause, in addition to any visible indicator, the playing of an associated Earcon via a speaker on the mobile device 100 or via a remotely associated earphone or headset. Alternatively, a functionality selection button may be available on a remotely associated headset or earphone, for example, as may be available on a common Bluetooth-enabled headset/microphone combination unit. Thus, selection of the functionality selection button on the example headset may be operative for causing the playing to the user of an Earcon associated with the presently in focus or top-level software application functionality.

Alternatively, a generic high-level voice command may be registered with the voice command module 268C for causing the presentation of an Earcon for the presently in focus software application functionality. That is, a generic voice command such as "Earcon," or "application," or "focus" may be registered with the voice command module 268C for causing a presentation of the presently applicable Earcon. That is, the generic voice command may take the place of a physical button for initiating navigation through the functionality of the presently in focus application or for changing the focus to a different application. For example, if a generic Earcon retrieval command of "Earcon" is employed, then a user may obtain an Earcon associated with the presently in focus software functionality by uttering the command "Earcon." That is, when the user speaks the command "Earcon," the voice command module 268C recognizes the spoken command as being the equivalent of the selection of a physical button for retrieving the currently in focus application Earcon.

For example, if the user's mobile telephone 100 presently has an electronic calendaring application as the in focus application, and the user speaks into the microphone of her example Bluetooth-enabled headset the word "Earcon," the voice command module 268C will recognize the word and will cause a determination of the presently in focus software application. In response, an Earcon such as "calendar" may be played back to the user to notify the user that the presently in focus software application functionality is the calendaring functionality of her electronic calendaring application. As should be appreciated, the word "Earcon" is for purposes of illustration only and is not limiting of the vast number of spoken words or sounds that may be used to denote an in focus application or to cause a determination of the presently in focus application.

Once the user establishes the position of the presently in focus software application, for example, the calendar functionality of her electronic calendaring application, the user may navigate down a hierarchical tree of functionality available to the presently in focus software application in the same manner as is used for initiating contact with the application. For example, after the user establishes that the presently in focus software application functionality is the calendar functionality of her electronic calendaring application, a subsequent selection of the functionality selection button on her mobile computing device 100 or on a related example headset may cause a navigation to functionality available under the example calendar functionality. For example, a second selection of the functionality selection key may cause a navigation to a scheduling functionality available under the calendaring functionality for allowing the user to effect the changes to a given scheduling appointment.

When navigation is performed to the next software functionality, for example, the scheduling functionality, an associated Earcon for the next in focus functionality may be played to the user to notify the user that movement to the next functionality has occurred. For example, if the user starts at a calendar function of her electronic calendaring functionality, she may receive an Earcon of "calendar," and after the user navigates down to a scheduling function available under the calendar function, she may be presented with an Earcon of "scheduling," or "appointments."

In addition to navigating through the various functionalities of an in focus software application, via the selection of a software functionality selection button or key, the navigation may occur through voice command by speaking a recognized voice command such as "next," or "next function," or the like. In order to traverse the functionality of an in focus application from a lower level back to a higher level or from an in focus application to a different application, a similar process may be employed. For example, a functionality selection key may be selected and held for a prescribed amount of time which may be an indicator for a reverse traversal from a lower level function, for example, "scheduling" back to a higher level function, for example, "calendar." Similarly, a voice command such as "back" or "previous" may be registered with the voice command module 268C for a reverse traversal of the functionality of an in focus application. As should be appreciated, each time an associated functionality is reached, an Earcon associated with the functionality may be played to the user to alert the user of the position in the software application to which the user has navigated.

Once the user reverse navigates to the highest level of a given software application, an additional reverse navigation command from the user may cause the navigation to a higher layer of commands applicable to selecting a different application from the available applications 305, 310, 315. For example, a layer of voice commands and associated Earcons may be organized into a menu from which a user may select a given application. Thus, once a user navigates to the highest level of functionality of a given software application, a next reverse navigation step may cause the playing of an Earcon such as "menu" for indicating to the user that the user may now traverse a menu of available software applications for selecting a different software application. The user may traverse the menu of available applications in the same manner with which the user may traverse the functionalities of an in focus application, and as the user traverses the menu of applications, an Earcon may be played to the user for each identified software application.

Referring back to FIG. 4, at operation 415, an audible focus indicator or Earcon is presented to the user to alert the user as to the presently in focus application or application functionality, as described above. At operation 420, a determination is made by the user as to whether the desired application or desired application functionality has been identified. For example, if the user desires the use of her telephone application 305, but the user hears an Earcon associated with an electronic calendaring application, the routine proceeds to operation 435, and the user must navigate to the menu of applications, described above, for traversing the menu of applications to find the desired application.

Back at operation 415, each time the user navigates to a different application or application functionality, an associated Earcon may be provided to alert the user of her present navigation position. At operation 425, if the user reaches a desired application 305, 310, 315 as indicated by the playing of an appropriate Earcon 330, 345, 350, the user may then traverse the command hierarchy. As described above, as the user traverses the command hierarchy of the desired software application the user may be provided with an Earcon for each functionality of the traversed application to constantly notify the user of her position in the command hierarchy of the presently in focus software application.

At operation 430, once the user navigates to a desired application functionality, for example, a phone messages functionality of her telephone application 305, the user may select the desired functionality either by voice command or by selecting a command selection key or button available for command selection. The routine ends at operation 495.

According to another embodiment, when a user receives a communication via her mobile computing device 100, an audible notification may be provided to the user, and a presently in focus application or functionality may be automatically changed to an application or functionality associated with the received notification. For example, if a telephone application 305 is the presently in focus software application on the user's mobile computing device 100, and the user receives an incoming electronic mail message, the application focus indicator application (AFI) 266 may be registered for notifications associated with the incoming message, for example, electronic mail notifications.

When the incoming message, for example, an electronic mail message, is received, the AFI application 266 may determine whether an alert notification is appropriate based on present delivery settings applied to the mobile computing device 100. If a notification is appropriate, the AFI application 266 may cause the generation of an audible notification associated with the incoming message for delivery to the user, and a presently in focus application or application functionality may be automatically changed to an application or application functionality focus applicable to the received message.

Figure 5:
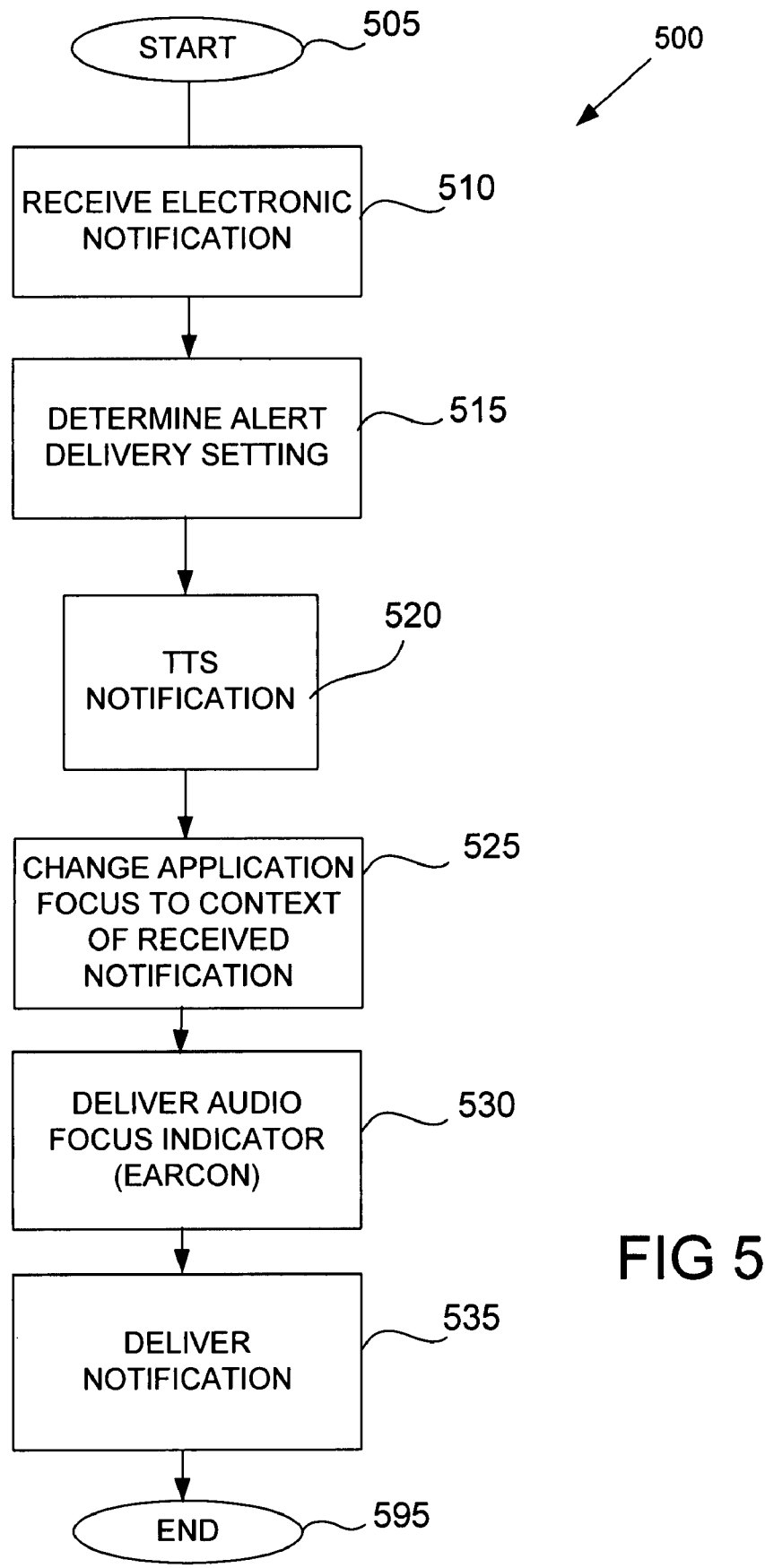
FIG. 5 is a logical flow diagram illustrating a method for providing a notification of a current software application focus.

FIG. 5 is a logical flow diagram illustrating a method for providing a notification of a current software application focus. The routine 500 begins at start operation 505 and proceeds to operation 510 where an electronic notification associated with an incoming message is received by the application focus indicator (AFI) application 266. For example, an electronic notification may be the result of a received electronic mail message from a remote user. For another example, an electronic notification may be a calendaring notification that would normally be presented on a user's computer display screen to notify the user that a scheduled appointment will occur shortly. Another example electronic notification may be associated with a task reminder. Indeed, any notification that may be presented to the user in association with any software application may be intercepted by the AFI application 266, as described herein.

At operation 515, the AFI application 266 determines an alert delivery setting for the user's mobile computing device 100. For example, a user may have employed a remote headset with an associated earphone for receiving alert notifications that allows the user to receive alert notifications privately outside of the hearing of other persons. If the user has configured her mobile computing device 100 to receive audible alert notifications via a headset only, then the AFI application 266 determines whether the headset associated with the mobile computing device 100 is on. If the user has configured her mobile computing device to allow alert notifications to be played via a speaker on the mobile computing device 100, then the AFI application 266 determines whether the mobile computing device speaker is enabled. On the other hand, if the user has configured her mobile computing device 100 for receipt of alert notifications via text only, then the AFI application 266 may determine that no audible notification should be delivered to the user.

At operation 520, if the AFI application 266 determines that an audible notification is appropriate based on the alert delivery setting configured by the user, the AFI application 266 passes received information, for example, electronic mail sender identification, electronic mail subject line text, appointment text, task due information, and the like to the text-to-speech module 268A for generation of a text-to-speech notification. In addition, based on the source of the received message, for example, an electronic mail application, an electronic calendaring application, the AFI application 266 may cause the speech recognition module 268B to "listen for" words or phrases that may be recognized as commands by the voice command module 268C for determining which software application should be used as the presently in focus software application and/or related functionality.

At operation 520, if the user has configured her mobile computing device 100 for receiving a TTS notification, the TTS notification is generated at the direction of the AFI application 266. At operation 525, the AFI application 266 automatically changes the presently in focus application or application functionality to an application or application functionality applicable to the received notification. For example, if the presently in focus application on the mobile computing device 100 is a telephone application 305, and the received electronic message is an electronic mail message, at operation 525, the presently in focus application will automatically be changed from a telephone application 305 to an electronic mail application 310. Thus, when the user retrieves her mobile computing device 100 in response to the TTS notification, the presently in focus software application will be the electronic mail application 310 to allow the user to quickly review the received electronic mail message.

At operation 530, if desired, once the in focus application is changed from the starting in focus application to an application associated with the received message, an Earcon may be played to the user to automatically notify the user that the in focus application has changed to an application applicable to the received electronic message. At operation 535, the TTS notification and the Earcon, if applicable, are delivered to the user, as described herein. The routine ends at operation 595.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of providing an audible indication of a position within one or more software application functionality hierarchies, comprising:
   receiving a request for an indication of a presently in focus application functionality;
   in response to receiving the request for an indication of a presently in focus application functionality, providing an audible application focus indicator for identifying the presently in focus application functionality, the presently in focus application functionality comprising an application functionality within a hierarchical tree comprising a plurality of available application functionalities;
   if a desired application functionality is not identified by the audible application focus indicator, navigating to another application functionality, the desired application functionality comprising a lower level application functionality with respect to the presently in focus application functionality within the hierarchical tree, the another application functionality comprising an application functionality which is at least one level below the presently in focus application functionality within the hierarchical tree; and
   providing an audible application focus indicator for the another application functionality.

2. The method of claim 1, wherein providing an audible application focus indicator for identifying the presently in focus application functionality includes providing an audible application focus indicator that is unique to the in focus application functionality.

3. The method of claim 1, wherein receiving a request for an indication of a presently in focus application functionality includes receiving the request for an indication of a presently in focus application functionality via a voice command.

4. The method of claim 1, wherein receiving a request for an indication of a presently in focus application functionality includes receiving the request for an indication of a presently in focus application functionality via a functionality control selection.

5. The method of claim 1, navigating to additional functionalities when the another application functionality is not the desired functionality, and for each additional application functionality navigated to, providing a unique audible application focus indicator to alert a user of a new presently in focus application functionality, the new presently in focus application functionality comprising the each additional application functionality navigated to.

6. The method of claim 1, wherein providing an audible application focus indicator for identifying the presently in focus application functionality comprises providing an audible application focus identifier for identifying a calendar functionality in an electronic calendaring application.

7. A method of automatically changing a presently in focus application functionality based on a received message, comprising:
   receiving a notification of an incoming message directed to a given application functionality;
   determining an alert delivery setting for a computing device receiving the notification of an incoming message;
   configuring a notification message for presentation in response to receiving the incoming message;
   determining a presently in focus application functionality, the presently in focus application functionality comprising an application functionality within a hierarchical tree comprising a plurality of available application functionalities;
   if the presently in focus application functionality is different from an application functionality associated with the incoming message, automatically making the application functionality associated with the incoming message a presently in focus application functionality, the application functionality associated with the incoming message comprising at least one of a lower level and a higher level application functionality with respect to the presently in focus application functionality within the hierarchical tree; and providing an application focus indicator for the application functionality associated with the incoming message.

8. The method of claim 7, wherein providing an application focus indicator for the presently in focus application functionality includes providing an audible application focus indicator.

9. The method of claim 7, wherein providing an application focus indicator for the presently in focus application functionality includes providing a visual application focus indicator.

10. The method of claim 7, wherein receiving a notification of an incoming message directed to a given application functionality includes receiving an incoming electronic mail message.

11. The method of claim 7, wherein receiving a notification of an incoming message directed to a given application functionality includes receiving an incoming calendar reminder notification.

12. The method of claim 7, wherein receiving a notification of an incoming message directed to a given application functionality includes receiving an incoming task reminder notification.

13. A computer readable medium containing computer executable instructions, which when executed, perform a method of providing an audible indication of a position within one or more software application functionality hierarchies, comprising:
   receiving a request for an indication of a presently in focus application functionality;
   in response to receiving the request for an indication of a presently in focus application functionality, providing an audible application focus indicator for identifying the presently in focus application functionality;
   receiving a notification of an incoming message directed to a given application functionality;
   determining a presently in focus application functionality, the presently in focus application functionality comprising an application functionality within a hierarchical tree comprising a plurality of available application functionalities;
   if the presently in focus application functionality is different from an application functionality associated with the incoming message, automatically making the application functionality associated with the incoming message a new presently in focus application functionality, the application functionality associated with the incoming message comprising at least one of a lower level and a higher level application functionality with respect to the presently in focus application functionality within the hierarchical tree; and
   providing an application focus indicator for the application functionality associated with the incoming message.

14. The computer readable medium of claim 13, prior to automatically making the application functionality associated with the incoming message a new presently in focus application functionality, further comprising:
   determining an alert delivery setting for a computing device receiving the notification of an incoming message; and
   configuring an application focus indicator for presentation in response to receiving the incoming message.

15. The computer readable medium of claim 13, further comprising:
   determining whether a desired application functionality is identified by the audible application focus indicator;
   if a desired application functionality is not identified by the audible application focus indicator, allowing a navigation to a different application functionality; and
   when a navigation to a different application functionality is accomplished, providing an audible application focus indicator for the different application functionality.

16. The computer readable medium of claim 15, wherein if a desired application functionality is identified, allowing navigation to additional functionalities associated with the desired functionality, and for each additional application functionality associated with the desired functionality navigated to, providing a unique audible application focus indicator to alert a user of a new presently in focus application functionality.

17. The computer readable medium of claim 13, wherein receiving a request for an indication of a presently in focus application functionality includes receiving the request for an indication of a presently in focus application functionality via a voice command.

18. The computer readable medium of claim 13, wherein receiving a request for an indication of a presently in focus application functionality includes receiving the request for an indication of a presently in focus application functionality via a functionality control selection.

19. The computer readable medium of claim 13, wherein providing an application focus indicator for the presently in focus application functionality includes providing an audible application focus indicator.

20. The method of claim 6, wherein navigating to another application functionality comprises navigating to a scheduling functionality available under the calendar functionality in the hierarchical tree.

* * * * *